March 1, 1938.　　　　O. E. HIXSON　　　　2,109,568
BEARING JIG
Filed March 13, 1935　　　　2 Sheets-Sheet 1
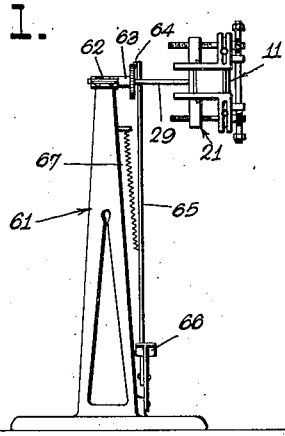
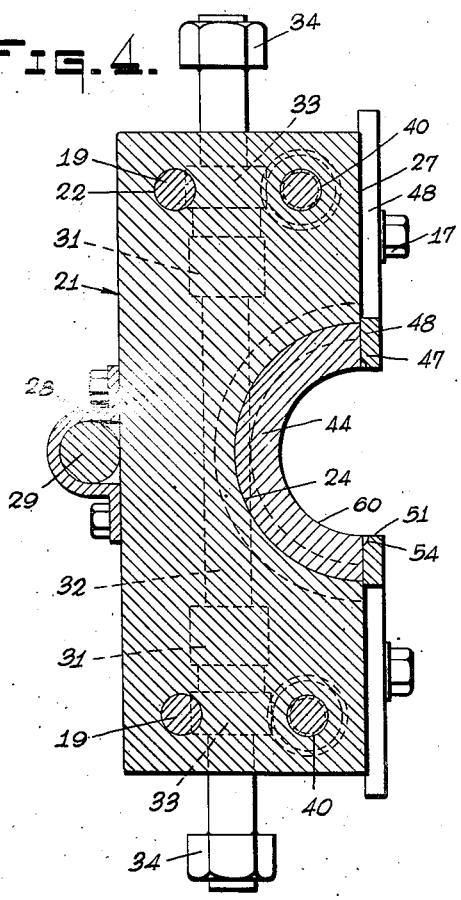
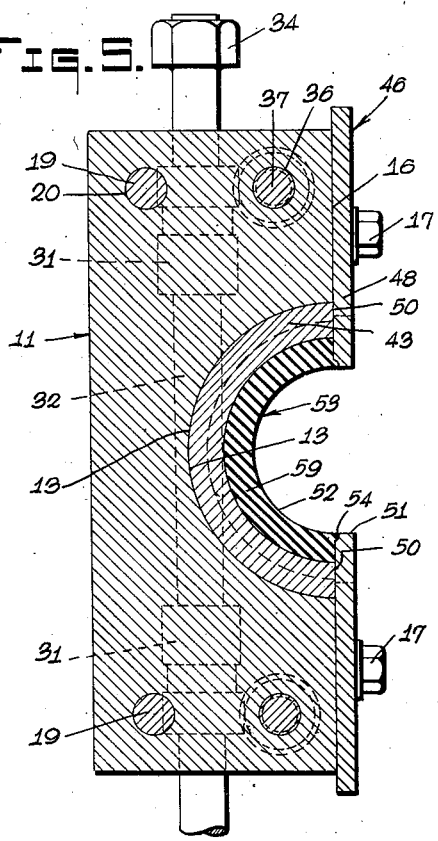
Inventor
O. E. Hixson
By Hazard and Miller
Attorneys.

March 1, 1938.    O. E. HIXSON    2,109,568
BEARING JIG
Filed March 13, 1935    2 Sheets-Sheet 2

Inventor
O. E. Hixson
By Hazard and Miller
Attorneys.

Patented Mar. 1, 1938

2,109,568

UNITED STATES PATENT OFFICE 2,109,568

BEARING JIG

Omer E. Hixson, Edom, Calif.

Application March 13, 1935, Serial No. 10,860

6 Claims. (Cl. 22—123)

My invention relates to a bearing jig or device for holding one-half of a bearing while bearing metal, such as babbitt is being cast or applied in such one-half or part of the bearing.

An object and feature of my invention is the construction of a jig or similar device in which a one-half section of a bearing sleeve or bearing case may be clamped and in which also end closure pieces may be located, which end pieces will form a guide in filling in the bearing metal. My procedure is done by melting the metal and working it into the sleeve a small part at a time and not by casting the whole of the bearing at one time.

My invention overcomes a number of difficulties and defects in forming cast bearing metals in bearing sleeves or the like, in that in the cast procedure, it is difficult to obtain a compact bearing metal as blow-holes and other spaces are frequently formed in the cast bearing metal which reduce the wearing qualities of the bearing when in use.

With my procedure, the bearing metal may be caused to flow into the bearing sleeve held in the chamber, a small amount at a time until a sufficient amount is filled into the sleeve to form the finished one-half bearing, such bearing being finished by boring or turning out the surplus bearing metal.

Another feature and object of my invention is forming the jig with a pair of substantial jig plates which each have a semi-circular opening, and also with a pair of semi-circular grooves of different depths formed in the contiguous faces of the jig plates. One of the jig plates is slidably mounted on a pair of guide rods extending at right angles to the other plate and is adjustable thereon by means of a pair of adjusting screws which are rotatably mounted in the main plate and threaded through the secondary plate. These screws each have a drive worm at one end, each worm being in mesh with a worm shaft rotatably mounted on the end face of the main jig plate and extending transversely thereacross. This worm shaft may be rotatably mounted by any suitable device and thus causes an even drawing together or separating of the main and the secondary jig plates.

Another feature of my invention comprises providing a plurality of sets of semi-circular rings which may be fitted in the semi-circular grooves of the main and secondary end plates. Innermost or contiguous partial rings are used to grip the ends of the bearing sleeve and thus clamp the sleeve effectively between the main and secondary jig plates. The outermost segmental rings are used to form an end closure for the bearing metal and also to provide a guide as to the depth to which the bearing is to be filled with the bearing metal.

Another feature of my invention comprises a pair of side straps which are adjustably mounted on the main end jig plate to slide inwardly and outwardly in a diametrical plane on the outer surface of this jig plate. The straps are preferably formed right-angular and have each a guide operating in a clamped stud and a guide stud to obtain this rectilinear motion in a diametrical plane. A portion of each strap extends parallel to the axis of the bearing and engages the upper edge of the bearing surface on opposite sides. It also contacts the upper surface of the secondary jig plate and the upper edges of the segmental inserted one-half rings. These straps also form a level to the filling in of the bearing metal at the opposite side edges of the bearing sleeve.

My invention may be effectively used for filling a bearing metal into one-half bearings of the main bearings of the crank shaft or other types of shaft, and also for forming bearings at the large end of connecting rods and also the connecting rod caps.

Another feature of my invention comprises mounting the jig on a rotatable shaft said shaft being preferably clamped to the secondary end jig plate, and as this shaft can be rotated the jig may be inverted for inserting the segmental one-half rings and fitting the bearing sleeve, or for instance, a connecting rod. When these are assembled the jig may then be tilted so that molten bearing metal may then be caused to flow into the mold formed by the various segmental rings and the sleeve of the bearing or connecting rod, or other article provided with a bearing metal.

My invention is illustrated in the accompanying drawings in which:

Fig. 1 is an edge view of my invention taken in the direction of the arrow 1 of Fig. 2 and showing the device mounted in a support.

Fig. 4 is a transverse section on the line 4—4 of Fig. 2 in the direction of the arrows.

Fig. 5 is a transverse view on the line 5—5 of Fig. 2 in the direction of the arrows.

Figure 2:
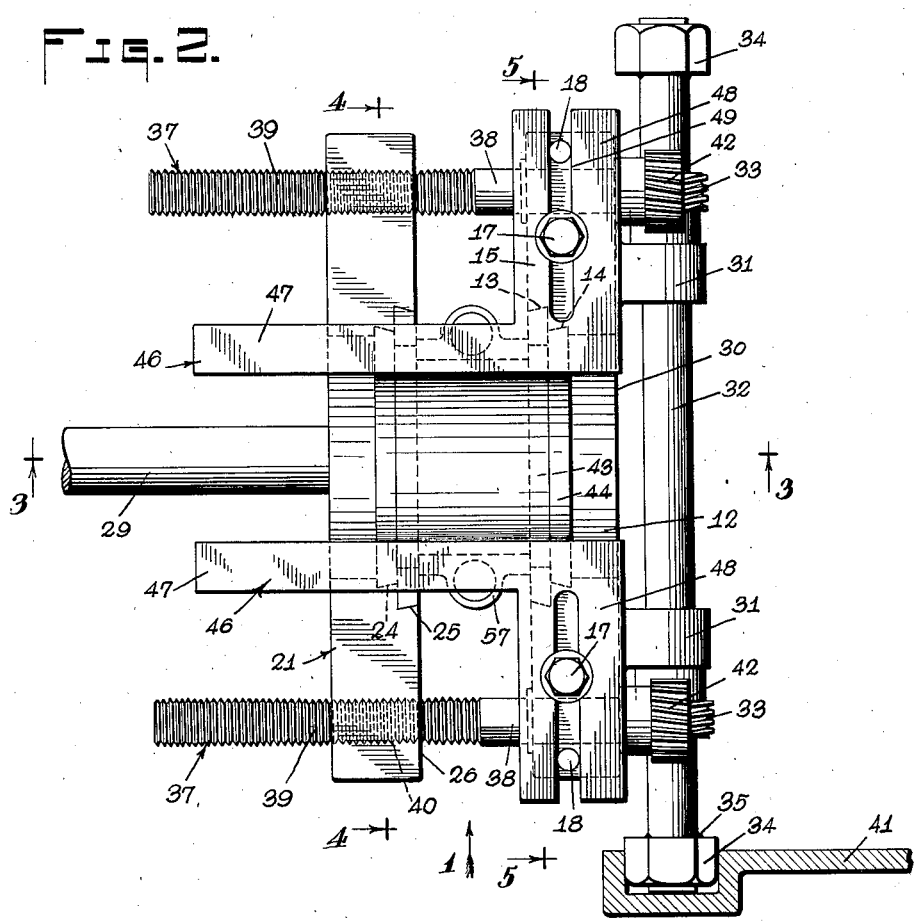
Fig. 2 is a plan view taken in the direction of the arrow 2 of Fig. 3.

My invention employs a primary or main jig plate 11. This is illustrated as being substantially rectangular viewed from the side and has a semi-circular cut-out section or opening 12 therethrough and a pair of semi-circular grooves 13 and 14. The groove 13 is adjacent the inner face 15 of the plate and is of greater depth than the groove 14. These grooves are shown as beveled whereas the cut-out section 12 is preferably cylindrical. On the upper edge 16 of the plate 12 there is a clamping stud 17 and a guide stud 18, there being a clamping stud and a guide stud on each of the upper faces 16. The clamping stud has a washer and a head to be engaged by a wrench. A pair of guide rods 19 is secured to the plate 11 and these rods extend to one side from the face 15. These rods extend preferably through perforations 20 in the plate 11 and are welded or otherwise secured therein.

Slidably mounted on the rods 19 there is a secondary jig plate 21. This jig plate has perforations 22 through which the rods 19 extend and on which the jig plate may slide. This jig plate has a semi-cylindrical cut-out section 23 and two semi-circular grooves 24 and 25, the groove 25 being adjacent the inner face 26. These grooves are formed with beveled surfaces and the grooves 13 and 25 are of the same depth, and the grooves 14 and 24 are likewise of the same depth. The upper surface 27 of the plate 21 is flat and is on the same plane as the upper surface 16 of the plate 11. In order to support the whole device a yoke 28 is secured to the lower edge of the secondary plate 21 and a supporting rod or bar 29 is tightly clamped in this yoke or otherwise secured thereto so that on turning the rod 29 the two jig plates may be rotated.

The means to adjust the spacing apart of the jig plates is as follows:

On the front or outside face 30 of the plate 11 there are two journals 31 in which is journaled the worm shaft 32. This worm shaft has two worms 33 thereon and is provided with nuts 34 threaded on each end and secured immovably by a weld 35, or the like. Rotatably journaled in a pair of perforations 36 which are preferably located adjacent the upper surface 16 and on opposite sides of the semi-cylindrical cut out section 12, there are two adjusting screws 37. Each screw has a cylindrical section 38 operating in the perforations 36 and a threaded section 39 threaded in threaded perforations 40 in the secondary jig plate 21. The worm shaft 32 may be rotated by wrench 41, engage either of the nuts 34, and as the adjusting screws 37 have a worm 42 meshing with the worms 33, the screws are simultaneously rotated and in the same direction. Thus the distance or spacing apart of the two jig plates may be adjusted.

Figure 3:
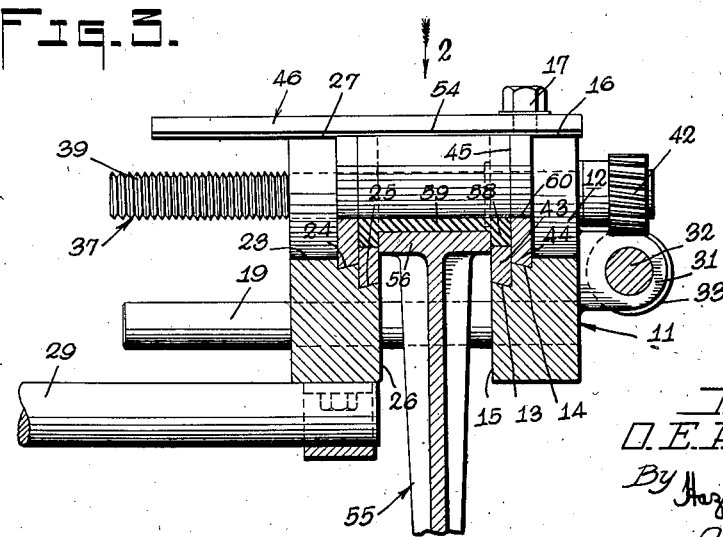
Fig. 3 is a longitudinal section taken on the line 3—3 on Fig. 2 in the direction of the arrows.

With the jig plates I employ a pair of larger diameter semi-circular rings 43 which fit into large diameter grooves 13 and 25 respectively of the jig plates, and a smaller pair of semi-circular rings 44 which fit into grooves 14 and 24 of these jig plates. Each of these pairs of rings is bevelled at its outer peripheral face to be accommodated by the bevelled grooves. This prevents the rings slipping out of plates during the assembly. The rings all have parallel faces as indicated at 45 transverse to the axis of the semi-circular openings 12—23 respectively in the jig plates and it will be noted in reference to Fig. 3 that these semi-circular rings overlap.

The side straps designated by the assembly numeral 46 have side portions 47 and end portions 48. The end portions have a longitudinal slot 49 to accommodate the guide studs 17 and 18 and these straps fit on the top 16 of the jig plate 11 and the top 27 of the jig plate 21. They also contact the upper edges 50 of the insertable semi-circular rings. By means of the studs the side portions 47 of the straps may be adjusted the proper distance apart and their contiguous faces 51 (note Figs. 4 and 5) are intended to align with the inner surface 52 of the bearing 53 to be formed. The side elements 47 of the straps have a slight undercut groove 54 to allow ready flow of the bearing metal. The side portions 47 are of sufficient length to accommodate the longest bearing it would be desirable to form in the jig.

In the illustration the device in which a bearing is being formed is illustrated as a connecting rod 55 which has a large end 56 which may be designated as a bearing wheel. This is fitted between the larger diameter insertable rings 43, the jig preferably being reversed and upside down for this purpose. The upper surface 57 of the shell then preferably abuts against the side portion 47 of the straps. With this particular type of bearing the rings 43—44 form a space to form the flange 58 of the bearing 53. The center portion 59 of such bearing is formed on the shell portion 56.

The manner of forming the bearing metal in the mold made by the jigs, the insertable semi-circular straps and the shell, is by tilting the jig by rotating the supporting rod 29 and then the bearing metal is heated to flow freely and deposited in the mold space. The metal is built up either to or slightly above the inner end cylindrical surface 60 of the rings 44. The longitudinal notch 54 aligns the metal to readily flow underneath the straps to completely fill the mold. When the bearing is complete it is removed from the jig and turned to the proper internal diameter.

In order to form bearings of a large number of different diameters I employ a plurality of sets of larger diameter rings 43 and smaller diameter rings 44. These are graduated in size in accordance with the standard dimensions of bearings, but, on account of the facility for inserting and removing the semi-circular rings, it is quite convenient to set the jigs to form a mold for many different sized bearings and for many different thicknesses of the bearing metal in the shells.

In order to provide a ready and convenient mechanism for rotating the rod 29 and thus the jig, I employ a stand 61 (note Fig. 1). This has a bearing 62 at the top in which is journalled the rod 29. A ratchet wheel 63 is secured to this rod and may be rotated step by step by means of a suitable pawl 64 actuated by a link 65, the link being reciprocated by means of the foot pedal 66. A spring 67 is used to retract the pawl and to lift the pedal. The ratchet is preferably designed so that on each down stroke of the pedal the ratchet wheel is rotated one tooth or notch. By this construction the jig may be readily rotated by hand to assemble or disassemble the various elements thereof and when the assembly is made for forming the bearing metal, the jig can be tilted to one side and then in a step by step manner slowly rotated while the molten bearing metal is built up in the mold.

Various changes may be made in the details of construction without departing from the scope of the invention as defined by the appended claims.

I claim:

1. A bearing jig comprising in combination a pair of jig plates, each having a semi-circular cut out section, means to clamp a bearing sleeve between said jig plates, a metal strap connecting the upper surface of each jig plate and engaging the upper edge of the bearing sleeve, the straps on opposite sides engaging the bearing sleeve in a diametrical plane and leaving exposed the inside surface of the bearing sleeve, means to mount the jig plates for rotation whereby the axis of the sleeve is retained parallel and displaced to the axis of rotation whereby melted metal may be poured onto the exposed inside surface of the bearing sleeve as said sleeve is slowly rotated to build up a bearing of solidified metal on the sleeve from one strap to the other strap.

2. In a bearing jig comprising in combination a pair of jig plates, means to mount said plates for adjustment to and from each other, each plate having a first and a second semi-circular ring mounted thereon whereby a shell on which a bearing metal is to be applied may be clamped between one of the rings on each jig plate, a strap covering the two jig plates and the shell on a diametrical edge of the shell whereby a mold is formed by the said straps, the second ring on each jig plate, the first ring on each plate engaging the end of the shell and the shell, means to mount the assembly of jig plates, rings, shell and straps, for rotation with the axis of the shell always parallel and displaced to the axis of rotation whereby melted metal may be deposited in the mold and solidified thereby building up a bearing metal from one strap to the other and between the second rings, the first rings engaging the shell being adapted to form a flange in the bearing so formed by the solidified metal.

3. A bearing jig comprising a first and second jig plate each having a semi-circular opening, a pair of guide rods secured to the first plate, the second plate being slidably mounted on said rods, and rotatable screws mounted on one of the plates and engaging the other plate to increase or decrease the spacing apart of said plates for clamping a bearing sleeve, each plate having a flat upper surface, a strap adjustably mounted and having clamping means therefor on one of the plates, the said strap extending between the two plates, the straps being on opposite sides of the semi-circular opening to completely expose the inner face of the bearing sleeve for pouring and solidifying of metal.

4. A bearing jig comprising a pair of jig plates each having a semi-cylindrical cut out section with top faces in the same plane through the diameters of the said cut-out sections, a guide means for said plates for a relative rectilinear but non-rotational motion of the plates on the axis of the cut-out section, a plurality of insertable semi-circular rings in each jig plate, a strap adjustably mounted on the flat surface of one of the jig plates and extending over the flat surface of the other plate on each side of the cut-out section, said strap engaging the ends of the rings and completely exposing the inside face of the bearing sleeves, means to draw the jig plates together to clamp a bearing sleeve and means forming a rotatable mounting for the jig plates parallel and displaced to the axis of the cut-out section.

5. A bearing jig comprising in combination means to clamp a bearing sleeve to form a mold with the inside surface of the bearing sleeve exposing the full area of a diametrical plane of the sleeve, means to rotate the clamping means and the sleeve while pouring metal into the mold whereby the axis of the sleeve is parallel and displaced to the center of rotation whereby molten metal may be poured into the mold formed in part by the inside face of the sleeve and the metal solidified as the clamping means with the sleeve is rotated to thereby apply the bearing metal to the inside face of the sleeve from one diametrical edge to the other diametrical edge.

6. A bearing jig comprising in combination a turning rod, means to support said rod for rotation, a secondary jig plate fixed to said rod, a primary jig plate, means to move and clamp the primary plate parallel to the secondary plate and at the desired distance therefrom, each of the jig plates having a first and a second groove, a pair of adjacent semi-circular rings mounted in the first grooves, a pair of remote semi-circular rings mounted in the second grooves, the adjacent rings being adapted to clamp a semi-cylindrical bearing sleeve with the axis of the sleeve and the rings aligned, such latter axis being parallel to but offset from the axis of the turning rod, the adjacent rings with the sleeve forming the mold for the outside periphery of the bearing, the remote rings forming the mold for the ends of the bearing, means to slowly rotate the rod with the jig plates, rings and bearing sleeve mounted thereon whereby molten bearing metal may be slowly poured into the mold formed by the two pairs of rings and the sleeve to build up a thickness of bearing metal thicker than that required in the finished bearing.

OMER E. HIXSON.